United States Patent

[11] 3,616,278

| [72] | Inventor | Lodewijk Jansen<br>St. Anthonis, Netherlands |
|---|---|---|
| [21] | Appl. No. | 748,054 |
| [22] | Filed | July 26, 1968 |
| [45] | Patented | Oct. 26, 1971 |
| [73] | Assignee | Stork Amsterdam N.V.<br>Amsterdam, Netherlands |
| [32] | Priority | July 27, 1967 |
| [33] | | Netherlands |
| [31] | | 6710441 |

[54] METHOD FOR MAKING A CYLINDRICAL FILM SCREEN
3 Claims, 6 Drawing Figs.

[52] U.S. Cl. ................................................ 204/11, 204/9
[51] Int. Cl. .................................................. C23b 7/00, C23b 7/02
[50] Field of Search ........................................ 204/11, 9, 38, 3, 4

[56] References Cited
UNITED STATES PATENTS

| 2,287,122 | 6/1942 | Norris | 204/11 |
|---|---|---|---|
| 2,291,829 | 8/1942 | Norris | 204/11 |
| 2,712,521 | 7/1955 | Aragones et al. | 204/12 |
| 2,874,085 | 2/1959 | Brietzke | 204/11 |
| 2,984,595 | 5/1961 | Schumpelt et al. | 204/281 |

FOREIGN PATENTS

| 8,108 | 1892 | Great Britain | 204/9 |
|---|---|---|---|
| 975,147 | 11/1964 | Great Britain | |

*Primary Examiner*—John H. Mack
*Assistant Examiner*—T. Tufariello
*Attorney*—Edmund M. Jaskiewicz ABSTRACT: Starting with an apertured cylindrical matrix an electrically insulating material is applied over the matrix to close the matrix apertures. A layer of metal is then deposited electrically on the matrix to form a metal film screen. A layer of transparent plastic material is then applied onto the metal film screen and the film screen of metal and transparent plastic is then removed from the matrix. The starting matrix may be expanded by mandrel or the like prior to the closing of the matrix openings and to carrying out the other steps and the outer diameter of the matrix is then reduced prior to removing the film screen therefrom. The starting cylindrical matrix may also comprise a thin-walled apertured sleeve which is deformed into a kidney-shaped section to reduce its outer diameter prior to removing the film screen therefrom.

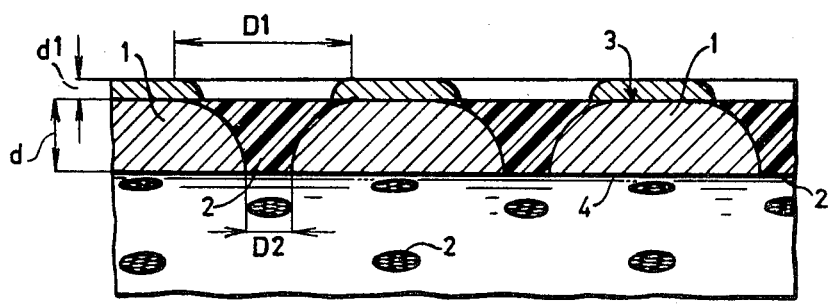
Fig: 1a.
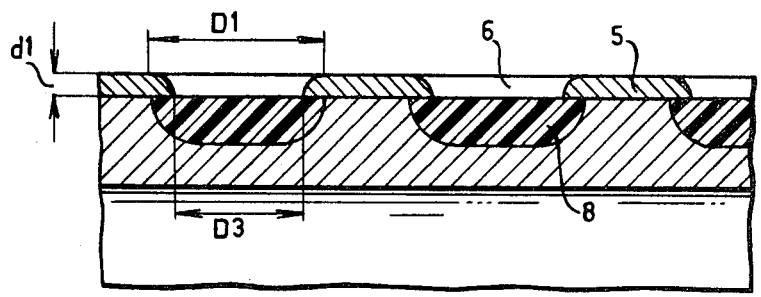
Fig: 1b.
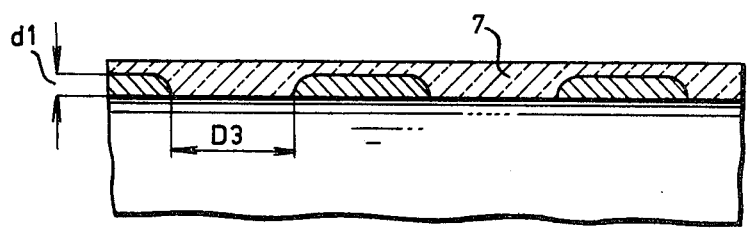
Fig: 1c.
LODEWIJK JANSEN
INVENTOR
Edmund M Jackiewicz
ATTORNEY

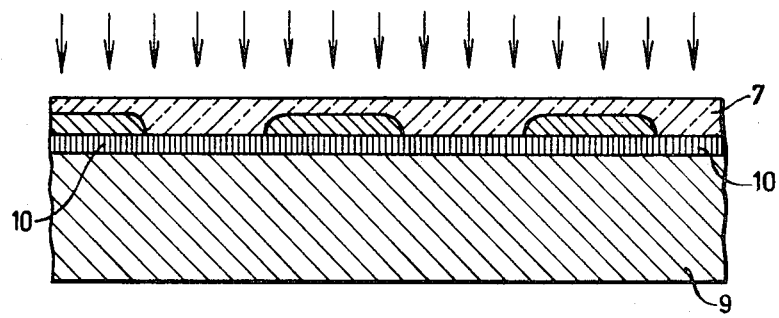
FIG: 2a.
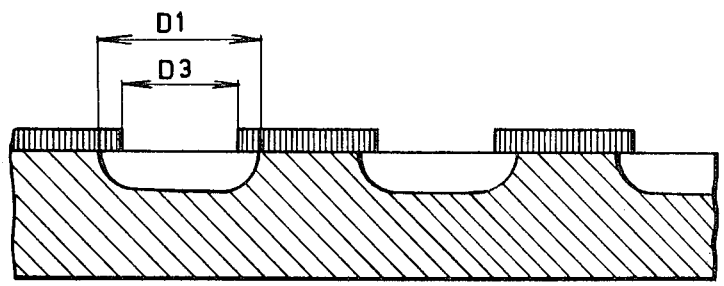
FIG: 2b.
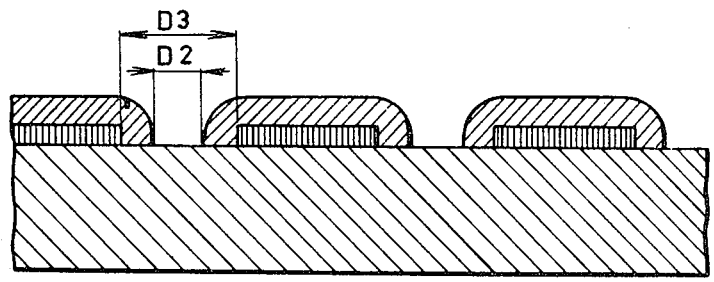
FIG: 2c.

METHOD FOR MAKING A CYLINDRICAL FILM SCREEN

The present invention relates to cylindrical film screens for use in forming cylindrical screens, matrices, stencils and the like by a photographic process, more particularly, to a method of making such a cylindrical film screen.

In the printing of textiles, paper and the like web or sheet material a film is used for making plain mesh or screen stencils by means of a photographic and electrodeposition process. These stencils are than used for making a design stencil which carries the desired pattern to be printed. Design stencils are generally made by a similar process using masks. Such films can also be used to form a pattern of dots on a solid, cylindrical, metal matrix which matrix can then be used for manufacturing plain mesh stencils.

Numerous attempts have been made to manufacture by means of a photographic process a closed endless film the surface of which is provided with a regular pattern of dots. Because of the degree of fineness of the screen where there may be, for example, 100 dots per linear inch to date there has been no success in making a film by means of a photographic process which functions satisfactorily. It has been proposed to start from a flat film of a finite length which is then wrapped around a cylinder. This process, however, results in insurmountable difficulties when the ends of the film are to be fastened to each other to form, in effect, and endless film around a cylinder. It has also been determined that it is not economically feasible to form by means of a photographic process a dot pattern of sufficient fineness upon a closed endless film by etching.

It has been determined, however, that if a film screen was available which is sufficiently light-permeable it would be possible to employ this film screen to manufacture a matrix, screen or stencil.

It is therefore the principal object of the present invention to provide a novel and improved process for manufacturing a cylindrical film screen.

It is another object of the present invention to provide a cylindrical film screen having sufficient mechanical strength, is easy to work with and can be used for forming a matrix, screen or stencil through a photographic process.

According to the present invention there is disclosed a method of making a cylindrical film screen for use in forming cylindrical stencils and the like by a photographic process with the film screen having a regular pattern of light-permeable apertures having a mesh X of between 60–120 apertures per linear inch and a maximum diameter of $D_2=70\frac{1}{2}X$. Upon a cylindrical matrix having openings therein whose maximum diameter is greater than the maximum diameter of the screen openings there is applied an electrical insulating material to close the matrix openings. A layer of metal is then deposited galvanically on the cylindrical matrix up to a thickness of 0.02 mm. to form a metal film screen on the matrix. A layer of transparent plastic material is then applied onto the metal film screen to a thickness of not less than 0.03 mm. The outer diameter of the cylindrical matrix is then reduced and the film screen of metal and transparent plastic is removed from the matrix.

Other objects and advantages of the present invention will be apparent upon reference to the accompanying description when taken in conjunction with the following drawings wherein:

FIG. 1a is a longitudinal sectional view on an enlarged scale of a portion of a plain-mesh stencil used as a cylindrical matrix upon which the film screen is formed;

FIG. 1b is a view similar to that of FIG. 1a but where the cylindrical matrix comprises a nonperforated sleeve;

FIG. 1c is a view similar to that of FIG. 1a and showing the completed film screen;

FIG. 2a is a view similar to that of FIG. 1a and showing the film screen of FIG. 1c being used in a photographic process to manufacture a matrix;

FIG. 2b is a view similar to that of FIG. 2a after the etching step has taken place; and FIG. 2c is a view similar to that of FIG. 2a and showing the formation of a matrix by galvanic deposition of metal.

Proceeding next to the drawings wherein like reference symbols indicate the same parts throughout the various views a specific embodiment and modifications of the present invention will be described in detail.

In FIG. 1 there is illustrated a plain-mesh or screen stencil 1 having a thickness $d$ which has been manufactured in a known way by a galvanic or electroplating process. The stencil 1 has apertures 2 therein which diverge toward the outer surface 3 of the stencil to their maximum diameter $D_1$. The diameter or dimension $D_2$ of the apertures on the inner surface 4 of the stencil is considerably smaller. In order to function satisfactorily as a film screen, the light-permeable apertures should have a dimension which is approximately equal to $D_3$. It is apparent that the stencil 1 illustrated in FIG. 1a cannot be used as a film screen since when used as such the light-permeable apertures are limited by the small dimension $D_2$ which is much too small.

The stencil 1 is therefore used as a starting matrix for forming the film screen according to the present invention. The stencil 1 which is a cylindrical sleeve is positioned on an expandable mandrel such as a pneumatic inflatable bag or upon a hydraulic expandable cylinder. By such use of an expandable mandrel the outer diameter of the stencil 1 can be increased a few hundredths of a millimeter or about the thickness of the metal layer which is to be electroformed thereon. An electrically insulating substance is then applied to the stencil 1 to close the apertures 2 as may be seen in FIG. 1a. A layer of metal 5 is then deposited on the outer surface of the matrix by a galvanic or electroforming process. The layer 5 has a thickness $d_1$ which is smaller than or at the most equal to 0.02 mm. As may be seen in FIG. 1b there will thus be formed openings having their greatest dimension or diameter $D_3$ which is less than $D_{1\,1}$ but greater than $D_2$.

The resulting metallic sleeve with the openings 6 can by itself be used as a film screen. However this sleeve lacks the required mechanical strength to adequately resist disruptive forces encountered during handling. According to the present invention the metallic sleeve 5 is thus embedded in a layer 7 of a suitable transparent plastic material as may be seen in FIG. 1c. After embedding the sleeve in the transparent plastic the expandable mandrel upon which the stencil has been mounted is released so that the outer diameter of the stencil can be reduced. The embedded film screen can now be readily removed from the starting matrix and will appear as now shown in FIG. 1c. This product is now a film screen and can be used as such to form stencils, matrices and screens in a manner known in the art.

The matrix 1 may also comprise a very thin-walled perforated sleeve. The outer diameter of such a matrix can be readily decreased by deforming the thin-walled sleeve into substantially a kidney-shaped section. The embedded film screen can now be readily removed from the matrix.

As shown in FIG. 1b a nonperforated sleeve or cylinder may also be used as the starting matrix. With such a matrix a regular continuous pattern of small pits, depressions or recesses 8 may be etched in the outer peripheral face. The remaining steps of the process are carried out in the same way in that the pits are filled with an electrically insulating material and a thin layer of metal electrically deposited thereon.

The layer of transparent plastic 7 in which the metal film screen is embedded has a thickness $d_2$ greater than or at least equal to 0.03 mm.

With respect to the cylindrical matrix used as a starting point for the process it is a requirement that the outer diameter of the cylindrical matrix can be reduced to facilitate removal of the film screen therefrom.

In FIGS. 2a–c there is illustrated a use of the film screen formed according to the present invention and illustrated in FIG. 1c wherein a photographic process is employed to form a regular continuous pattern of apertures. Upon a base or background 9, there is deposited a layer of light-sensitive material 10. By a photographic process the desired pattern or design is formed upon the light-sensitive layer 10 and the exposed portions of this layer are washed away so that the nonexposed areas or lands remain on the base 9. The base 9 is then etched to produce the matrix as shown in FIG. 2b.

As an alternative, the light-sensitive layer 10 and the open areas on the base 9 may be treated in an appropriate and known manner and metal then precipitated over the lands by an electrical or galvanic process. The result will be as illustrated in FIG. 2c.

Thus it can be seen that the present invention has disclosed an economical and simplified process for producing a cylindrical film screen. Resulting film screen can then be employed with a photographic process in a known manner to produce cylindrical matrices, screens and stencils for use in various printing operations. The starting matrix may be either a solid sleeve with small pits or recesses etched therein or a plain mesh or screen stencil as long as both the sleeve and stencil are susceptible to a temporary reduction in their outer diameters.

Specific examples of the materials used in the process of the present invention will be described below. The electrically insulating substance may be an epoxy resin, silicone resins or a polyester resin. The metal layer 5 may be of nickel or copper. The transparent plastic material 7 may be a flexible epoxy resin which is highly transparent for ultraviolet rays, or an acrylate resin.

It will be understood that this invention is subject to modification in order to adapt it to different uses and conditions and, accordingly, it is desired to comprehend such modification within this invention as may fall within the scope of the appended claims.

What is claimed is:

1. In a method of making a cylindrical film screen for use in forming cylindrical stencils and the like by a photographic process with the film screen having a regular pattern of light-permeable apertures having a mesh X of between 60–120 apertures per linear inch and a maximum diameter on the inner surface of $D_2=70\tfrac{1}{2}X$, the steps of closing with an electrically insulating material the openings in a cylindrical matrix where the openings have a maximum diameter $D_1$ on the outer surface greater than $D_2$, depositing electrically on the outer surface of the cylindrical matrix a metallic layer up to a thickness of 0.02 mm to form a thereon a metal film screen with openings having a diameter $D_3$ such that $D_1>D_3>D_2$, applying a layer of transparent plastic material on the outer surface of the metal film screen to a thickness of not less than 0.03 mm. while the metal film screen is on the matrix, and removing the film screen of metal and transparent plastic from the matrix.

2. In a method as claimed in claim 1 with the step of increasing the outer diameter of the cylindrical matrix prior to the closing of the openings therein and carrying out the other steps.

3. In a method as claimed in claim 1 with the starting cylindrical matrix comprising a thin-walled apertured sleeve, and deforming the sleeve into a substantially kidney-shaped section to reduce the outer diameter thereof.

* * * * *

PO-1050
(5/69)

UNITED STATES PATENT OFFICE
CERTIFICATE OF CORRECTION

Patent No. 3,616,278        Dated October 26, 1971

Inventor(s) Lodewijk Jansen

It is certified that error appears in the above-identified patent and that said Letters Patent are hereby corrected as shown below:

In column 1, line 48 and in column 4, line 9 the equation should appear as follows:

$$D_2 = 70 - 1/2 \, X$$

The priority date should read as follows:

July 28, 1967

Signed and sealed this 18th day of April 1972.

(SEAL)
Attest:

EDWARD M. FLETCHER, JR.
Attesting Officer

ROBERT GOTTSCHALK
Commissioner of Patents